United States Patent
Quarles, Jr.

(10) Patent No.: US 12,074,017 B2
(45) Date of Patent: Aug. 27, 2024

(54) INLINE CHEMICAL AGENT ADDITION FOR INLINE REACTION WITH FLUID SAMPLE FOR ANALYTIC DETERMINATIONS

(71) Applicant: Elemental Scientific, Inc., Omaha, NE (US)

(72) Inventor: Charles D. Quarles, Jr., Lawrenceville, GA (US)

(73) Assignee: Elemental Scientific, Inc., Omaha, NE (US)

(*) Notice: Subject to any disclaimer, the term of this patent is extended or adjusted under 35 U.S.C. 154(b) by 768 days.

(21) Appl. No.: 17/166,757

(22) Filed: Feb. 3, 2021

(65) Prior Publication Data

US 2021/0242005 A1 Aug. 5, 2021

Related U.S. Application Data

(60) Provisional application No. 62/969,423, filed on Feb. 3, 2020.

(51) Int. Cl.
*H01J 49/04* (2006.01)
*B01L 3/00* (2006.01)
(Continued)

(52) U.S. Cl.
CPC .......... *H01J 49/0413* (2013.01); *B01L 3/502* (2013.01); *B01L 3/567* (2013.01); *G01N 30/72* (2013.01);
(Continued)

(58) Field of Classification Search
CPC ....... H01J 49/0413; H01J 49/165; H01J 49/26
See application file for complete search history.

(56) References Cited

U.S. PATENT DOCUMENTS

| 2011/0306146 A1* | 12/2011 | Sidhu | G01N 30/8658 422/62 |
| 2017/0030932 A1 | 2/2017 | Ledden | |

(Continued)

FOREIGN PATENT DOCUMENTS

JP 11006788 1/1999

OTHER PUBLICATIONS

International Search Report and Written Opinion for PCT/US2021/016433, dated May 12, 2021.

(Continued)

*Primary Examiner* — Joseph L Williams
(74) *Attorney, Agent, or Firm* — Kevin E. West; Advent, LLP

(57) ABSTRACT

Systems and methods for controlled, inline introduction of chemical agents to an inline fluid sample are described. A method embodiment includes, but is not limited to, receiving a fluid sample with a valve; receiving a chemical agent with the valve; introducing the fluid sample and the chemical agent inline via a mixing port of the valve to produce a mixed sample; transferring the mixed sample to a second valve; directing the mixed sample to a sample holding loop fluidically coupled with the second valve; holding the mixed sample within the sample holding loop for a holding period of time to permit a reaction between the fluid sample and the chemical agent; and directing the mixed sample from the sample holding loop to an analytic instrument following expiration of the holding period of time.

18 Claims, 7 Drawing Sheets

(51) Int. Cl.
  *G01N 30/72*    (2006.01)
  *H01J 49/10*    (2006.01)
  *H01J 49/16*    (2006.01)
  *H01J 49/26*    (2006.01)

(52) U.S. Cl.
  CPC .......... *H01J 49/105* (2013.01); *H01J 49/165* (2013.01); *B01L 2200/10* (2013.01); *B01L 2200/16* (2013.01); *B01L 2300/049* (2013.01); *H01J 49/26* (2013.01)

(56) References Cited

U.S. PATENT DOCUMENTS

| | | |
|---|---|---|
| 2017/0059580 A1 | 3/2017 | Ozbal |
| 2017/0162373 A1 | 6/2017 | Field et al. |
| 2018/0038837 A1 | 2/2018 | Ito et al. |
| 2019/0242797 A1 | 8/2019 | Wiederin et al. |

OTHER PUBLICATIONS

Will, Jonas M. et al., "Automated Chiral Analysis of Amino Acids Based on Chiral Derivatization and Trapped Ion Mobility—Mass Spectrometry," ACS (American Chemical Society) Publications, Accepted: Dec. 8, 2020, 8 pages.

* cited by examiner

INLINE CHEMICAL AGENT ADDITION FOR INLINE REACTION WITH FLUID SAMPLE FOR ANALYTIC DETERMINATIONS

CROSS-REFERENCE TO RELATED APPLICATIONS

The present application claims the benefit of 35 U.S.C. § 119(e) of U.S. Provisional Application Ser. No. 62/969,423, filed Feb. 3, 2020, and titled "INLINE CHEMICAL AGENT ADDITION FOR INLINE REACTION WITH FLUID SAMPLE FOR ANALYTIC DETERMINATIONS." U.S. Provisional Application Ser. No. 62/969,423 is herein incorporated by reference in its entirety.

BACKGROUND

Spectrometry refers to the measurement of radiation intensity as a function of wavelength to identify component parts of materials. Inductively Coupled Plasma (ICP) spectrometry is an analysis technique commonly used for the determination of trace element concentrations and isotope ratios in liquid samples. For example, in the semiconductor industry, ICP spectrometry can be used to determine metal concentrations in samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample. The sample to be analyzed is often provided in a sample mixture. Electrospray ionization mass spectrometry (ESI-MS) is an analysis technique that applies a voltage to a liquid sample to produce an ionized electrospray for analysis by a mass spectrometer.

Sample introduction systems may be employed to introduce liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) or ESI-MS instrumentation for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods for controlled, inline introduction of chemical agents to an inline fluid sample are described. The chemical agents can influence detection of one or more species of interest from the sample, such as by tagging biological or metallic species, producing polyatomic combinations, reacting with chemical species of interest or otherwise influencing chemical kinetics of the sample or portion thereof, or combinations thereof. The fluid sample and chemical agents in the combined mixture can be permitted to interact for a time period prior to introduction of the combined mixture or a portion thereof to analysis instrumentation, such as to provide a predetermined time for reactions to occur. The combined mixture can be directed to a separation column to retain one or more portions of the mixture for later elution while permitting passage of the remainder of the mixture to pass to the analysis instrumentation or other portion of the system (e.g., waste).

A method embodiment includes, but is not limited to, receiving a fluid sample from an autosampler with a valve system; receiving a chemical agent with the valve system; introducing, via a pump system, the fluid sample and the chemical agent inline via a mixing port of the valve system to produce a mixed sample; transferring, via the pump system, the mixed sample to a sample holding loop fluidically coupled with the valve system; holding the mixed sample within the sample holding loop for a holding period of time to permit a reaction between the fluid sample and the chemical agent; and directing, via the pump system, the mixed sample from the sample holding loop to an analytic instrument following expiration of the holding period of time.

A method embodiment includes, but is not limited to, receiving a fluid sample with a first valve; receiving a chemical agent with the first valve; introducing, via a pump system, the fluid sample and the chemical agent inline via a mixing port of the first valve to produce a mixed sample; transferring, via the pump system, the mixed sample to a second valve; directing the mixed sample to a sample holding loop fluidically coupled with the second valve; holding the mixed sample within the sample holding loop for a holding period of time to permit a reaction between the fluid sample and the chemical agent; and directing, via the pump system, the mixed sample from the sample holding loop to an analytic instrument following expiration of the holding period of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. In the figures, the use of the same reference numbers in different instances in the description and the figures may indicate similar or identical items.

DETAILED DESCRIPTION

Figure 1:
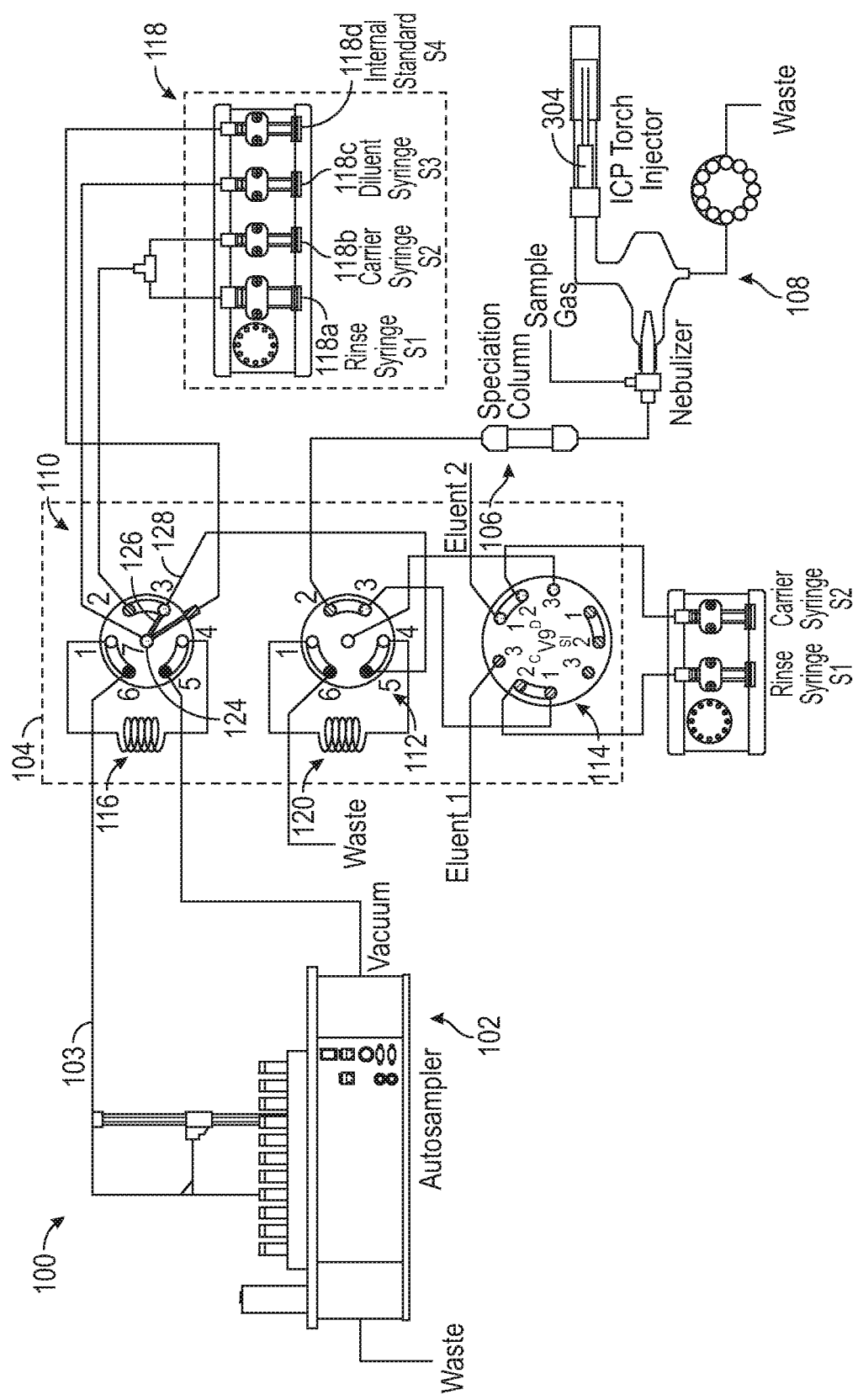
FIG. 1 is an illustration of a sample preparation system for inline addition of chemical agents to samples for analytic determinations in accordance with example implementations of the present disclosure.

Referring to FIGS. 1-7, systems and methods for controlled, inline introduction of chemical agents to an inline fluid sample prior to analytic determination of one or more species of interest are described. Analysis of the various species of an element is an important aspect of sample analysis, particularly where an assay of the particular element alone may not provide all relevant information associated with that element. For instance, differing species of an element can have remarkably different toxicity levels, where knowledge of an amount of the element in general does not provide an indication as to the toxicity of that element. For example, one species of chromium (e.g., Cr(III)) can provide nutritive benefits, whereas another species of chromium (e.g., Cr(VI)) is toxic to humans as a carcinogen. As another example, some organic arsenic species (e.g., arsenobetaine (AsB)) can be relatively non-toxic or have low toxicity, whereas inorganic arsenic species (e.g., arsenite (As(III)), arsenate (As(V))) are highly toxic. As a further example, organic mercury (methylmercury) is more toxic than the inorganic form (Hg II).

Mass spectrometry techniques can be utilized to determine the presence of certain chemical elements, even at extremely low concentrations, however mass spectrometry does not typically distinguish between differing species of the chemical elements. One procedure to differentiate different species of an element includes using a separation column (e.g., a chromatographic column, a speciation column, etc.) to separate the differing portions or species from a fluid stream over time, where the portions or species can be measured at the analytic instrument (e.g., ICP-MS, ICP, ESI-MS, etc.) as peaks of the element at various times as the portions or species are separated. Alternatively or additionally, chemical agents can be introduced to a sample to interact with one or more portions of a sample to influence the ability of the analytic instrument to detect the sample or portions thereof with or without introduction to a separation column, or can chemically change portions of the sample to provide reaction products for analysis. The chemical agent can include a tag configured for specific association with a species of interest in the sample, such as through a binding mechanism, a chemical reaction to produce a more detectable species, a polyatomic combination, or the like. For example, the chemical agent can include, but is not limited to, a derivatization agent, a chelation agent, a bio-tag, a metal-tag, a chemical agent configured to induce a reaction, a chemical agent configured to produce a polyatomic combination with the sample or portion thereof, or combinations thereof, that produces a molecular species that can be more easily detected or have better detection resolution than analysis of the sample alone.

Sample peaks measured by a detector can be influenced by the matrix compositions of the various materials sampled and the timing of when certain agents are added to a sample. For example, the shape of the peak, the times at which the peaks arise, etc., can be influenced by the matrix compositions of the sample. To avoid large deviations in the sample analysis, the samples can be diluted to lower concentrations to minimize the effects of the matrix on the sample analysis, such as by avoiding substantial changes to the chemistry of the particular speciation column. However, attempting to pre-dilute the sample can cause species of the particular element of interest to convert to a different species of that element ("species interconversion"), resulting in an erroneous analysis of the amount of species by the ICP-MS. For example, it has been determined that organic species of arsenic (e.g., arsenobetaine (AsB), dimethylarsinic acid (DMA), and monomethylarsonic acid (MMA)) can covert to inorganic species of arsenic (e.g., arsenate (As(V))) when manually pre-diluted in a sample vial (e.g., a sample vial accessible by an autosampler). Thus, while the total amount of the chemical element of interest would be measured the same by the ICP-MS, the amount of the individual species of the chemical element of interest would differ due to the conversion of one species of the chemical element to another species prior to analysis. Further, introducing a reactive chemical agent to a sample can change the composition of a sample, for example, based on the particular kinetics of the reaction, intermediate reactions, and the like. As such, the timing of when a chemical agent is introduced to a sample can influence the accuracy and/or ability of an analysis instrument to analyze the sample. For instance, if a chemical agent is introduced to a number of samples at the same time or in a serial manner, the kinetics of the reactions in each sample may progress for different and imprecise time periods before introduction to the analysis instrument, leading to inconsistent analysis conditions.

Accordingly, the present disclosure is directed to controlled, inline introduction of chemical agents to an inline fluid sample prior to analytic determination of one or more species of interest. Samples are transported inline through the system through automatic control of valve and pump systems to provide precise control of flow rates and timing of sample introduction to various portions of the system. Chemical agents are introduced inline to specific volumes of sample at one or more mixing sites (e.g., a mixing port of a valve). The chemical agent and sample are permitted to interact for a specific period of time prior to introduction of the mixture to the analysis instrument. The time of interaction between the sample and the chemical agent can be selected based on kinetics of a desired reaction between species of the sample and chemical agent, binding rates between species of the sample and chemical agent, or other interactions. By providing inline and automatic chemical addition, samples can be analyzed in real time with precise control over the time of interaction between the sample and the added chemical(s). For instance, if multiple samples are pre-loaded with chemical agents (e.g., samples present in sample vials at a sample rack), each sample would have a different time of interaction between sample and chemical agent while waiting for an autosampler or laboratory technician to remove the pre-treated sample for analysis (which can provide time for the species to convert to a different species or uncontrolled reaction times and conditions during sample pendency). Further, introduction of fluids following separation of the chemical species with a separation column allows for post-column dilution (e.g., to provide favorable column separation conditions, while avoiding saturation of ICP-MS cones), introduction of standards for intermittent internal checks, continuous operation stability checks, etc., introduction of chemicals for derivatization (e.g., to form detectable complexes with otherwise difficult-to-detect species just before analysis), and the like.

In the following discussion, example implementations of techniques for providing controlled, inline introduction of chemical agents to an inline fluid sample prior to analytic determination of one or more species of interest are presented.

Example Implementations

FIG. 1 illustrates a system 100 for providing controlled, inline introduction of chemical agents to an inline fluid sample prior to analytic determination of one or more species of interest in an example implementation. As shown, the system 100 generally includes a sampling device 102 (e.g., autosampler), a valve system 104, and a separation column 106 in fluid communication with an ICP torch assembly 108. While the system 100 is shown with ICP fluid handling equipment, the system 100 can be utilized with other analytic instrumentation including, but not limited to, electrospray ionization mass spectrometry (ESI-MS). The valve system 104 includes one or more valves switchable between a plurality of positions to facilitate flow of various fluids (e.g., sample fluids, carrier fluids, diluent fluids, internal standard fluids, eluent fluids, rinse fluids, etc.) through the system 100. In an implementation, the valve system 104 includes at least a first valve 110, a second valve 112, and a third valve 114. For example, one or more of the first valve 110, the second valve 112, and the third valve 114 can be rotary valves switchable between valve configurations to facilitate different flow paths for fluids flowing through the respective valve between different valve configurations. The first valve 110 is coupled to the sampling device 102 to receive a sample 103 and to hold the received sample 103, such as in a holding loop 116. For example, in an implementation the first valve 110 is switchable between at least two configurations, wherein in a first valve configuration, the first valve 110 provides a flow path to receive the sample 103 from the sampling device 102 and direct the received sample 103 to the holding loop 116. The first valve 110 is also coupled to a pump system 118 configured to supply to the first valve 110 one or more internal standards (or other chemical agents), diluents, carriers, and rinse solutions. In an implementation, the pump system 118 includes a plurality of syringe pumps shown as 118a, 118b, 118c, and 118d that are controlled to move each respective syringe at a particular rate to create desired dilutions of the sample and/or standard or chemical additions to the sample at the first valve 110. For example, the first valve 110 can switch to a second valve configuration having a flow path to receive one or more of a carrier fluid from the carrier syringe pump 118b, a diluent fluid from the diluent syringe pump 118c, and a standard fluid from the standard syringe pump 118d, whereby the fluids provide inline dilution of the sample 103 and deliver the diluted sample from the first valve 110 to the second valve 112. While four syringe pumps are shown in FIG. 1, it is can be appreciated that fewer than four syringe pumps or greater than four syringe pumps could also be utilized. In an implementation, each of the syringe pumps of the pump system 118 (e.g., syringe pumps 118a, 118b, 118c, and 118d) can operate at a particular injection rate to provide the controlled dilution or the controlled standard or chemical addition at the first valve 110. As an example, the following Table 1 illustrates flow rates for standard (e.g., via syringe pump 118d) and diluent (e.g., via syringe pump 118c) to provide various inline dilution factors (e.g., from the first valve 110) for automatic preparation of various calibration curves. In an implementation the diluent, standard, and/or sample can be mixed via a mixing portion of the first valve 110, where the mixing portion can include one or more of a mixing port 124, a mixing channel 126, and a fluid transfer line 128 coupled between the first valve 110 and the second valve 112, to bring the diluent, standard, and/or sample together for mixing. The inline dilution factors can be prepared for individual species of an element (e.g., Cr(III) and Cr(VI); arsenobetaine (AsB), dimethylarsinic acid (DMA), monomethylarsonic acid (MMA) arsenite (As(III)), and arsenate (As(V)); etc.), such as to provide individualized calibration curves for each species under analysis.

TABLE 1

Calibration Curve Flow Rates

| Standard Position | Inline Dilution Factor | Standard Flow Rate (μL/min) | Diluent Flow Rate (μL/min) | Total Flow Rate (μL/min) | Concentration (100 ppt) |
|---|---|---|---|---|---|
| 1 (Blank) | 200× | 50 | 9950 | 10000 | 0 |
| 2 (Species A) | 20× | 500 | 9500 | 10000 | 5 |
| 2 (Species A) | 10× | 1000 | 9000 | 10000 | 10 |
| 2 (Species A) | 6.6× | 1500 | 8500 | 10000 | 15 |
| 2 (Species A) | 5× | 2000 | 8000 | 10000 | 20 |
| 2 (Species A) | 4× | 2500 | 7500 | 10000 | 25 |
| 2 (Species A) | 2× | 5000 | 5000 | 10000 | 50 |

Figure 2:
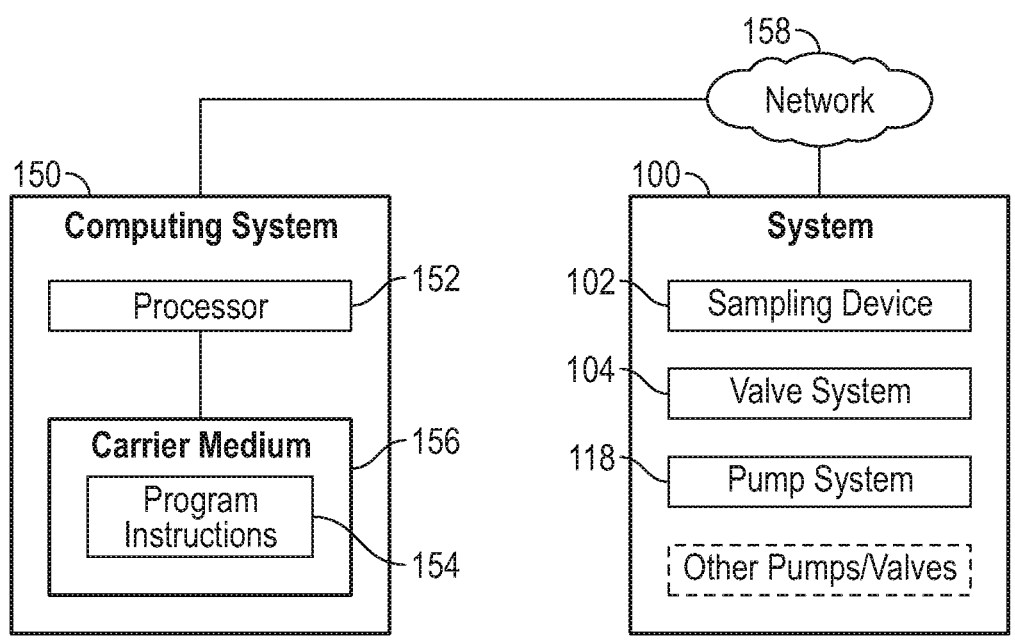
FIG. 2 is a block diagram illustrating a computing system for controlling a system for inline addition of chemical agents to samples for analytic determinations, such as the system shown in FIG. 1.

In an implementation, the inline dilution factors, introduction of standard or chemical agents, and introduction of other fluids are facilitated through automatic control of one or more components of the system 100. For example, electromechanical devices (e.g., electrical motors, servos, actuators, or the like) may be coupled with or embedded within the valve system 104 (e.g., the first valve 110, the second valve 112, the third valve 114, etc.), and/or the pump system 118 (e.g., syringe pumps 118a, 118b, 118c, and 118d, etc.), and/or another pump/valve to facilitate automated operation via control logic embedded within or externally driving the system 100. The electromechanical devices can be configured to cause the plurality of valves to direct fluid flows from syringe pumps 118a, 118b, 118c, and 118d, and from other syringes, flow paths, eluent sources, etc., according to one or more modes of operation. As shown in FIG. 2, the system 100 may be controlled by a computing system 150 having a processor 152 configured to execute computer readable program instructions 154 (i.e., the control logic) from a non-transitory carrier medium 156 (e.g., storage medium such as a flash drive, hard disk drive, solid-state disk drive, SD card, optical disk, or the like). The computing system 150 can be connected to various components of the system 100, either by direct connection, or through one or more network connections 158 (e.g., local area networking (LAN), wireless area networking (WAN or WLAN), one or more hub connections (e.g., USB hubs), and so forth). For example, the computing system 150 can be communicatively coupled to the sampling device 102, the valve system 104, the pump system 118, components thereof, any of the various pumps or valves provided herein, or combinations thereof. The program instructions 154, when executing by processor 152, can cause the computing system 150 to control the auto-sampling system 100 (e.g., control the pumps and valves) according to one or more modes of operation (e.g., automatic calibration curve(s), sample collection, sample dilution, chemical agent addition, chemical agent interaction time, speciation, speciation bypass, post-speciation fluid addition, etc.), as described herein. In an implementation, the program instructions 154 form at least a portion of software programs for execution by the processor 152.

The processor 152 provides processing functionality for the computing system 150 and may include any number of processors, micro-controllers, or other processing systems, and resident or external memory for storing data and other information accessed or generated by the computing system 150. The processor 152 is not limited by the materials from which it is formed or the processing mechanisms employed therein and, as such, may be implemented via semiconductor(s) and/or transistors (e.g., electronic integrated circuits (ICs)), and so forth.

The non-transitory carrier medium 156 is an example of device-readable storage media that provides storage functionality to store various data associated with the operation of the computing system 150, such as a software program, code segments, or program instructions 154, or other data to instruct the processor 152 and other elements of the computing system 150 to perform the techniques described herein. Although a single carrier medium 156 is shown in FIG. 2, a wide variety of types and combinations of memory may be employed. The carrier medium 156 may be integral with the processor, stand-alone memory, or a combination of both. The carrier medium 156 may include, for example, removable and non-removable memory elements such as RAM, ROM, Flash (e.g., SD Card, mini-SD card, micro-SD Card), magnetic, optical, USB memory devices, and so forth. In embodiments of the computing system 150, the carrier medium 156 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing system 150 can include one or more displays to display information to a user of the computing system 150. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments. The display may be provided with a touch screen to receive input (e.g., data, commands, etc.) from a user. For example, a user may operate the computing system 150 by touching the touch screen and/or by performing gestures on the touch screen. In some embodiments, the touch screen may be a capacitive touch screen, a resistive touch screen, an infrared touch screen, combinations thereof, and the like. The computing system 150 may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing system 150 may also include a communication module representative of communication functionality to permit computing device to send/receive data between different devices (e.g., components/peripherals) and/or over the one or more networks 158. The communication module may be representative of a variety of communication components and functionality including, but not necessarily limited to: a browser; a transmitter and/or receiver; data ports; software interfaces and drivers; networking interfaces; data processing components; and so forth.

The one or more networks 158 are representative of a variety of different communication pathways and network connections which may be employed, individually or in combinations, to communicate among the components of the inline dilution and autocalibration system environment (e.g., system 100). Thus, the one or more networks 158 may be representative of communication pathways achieved using a single network or multiple networks. Further, the one or more networks 158 are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth. Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing system 150 is described as including a user interface, which is storable in memory (e.g., the carrier medium 156) and executable by the processor 152. The user interface is representative of functionality to control the display of information and data to the user of the computing system 150 via the display. In some implementations, the display may not be integrated into the computing system 150 and may instead be connected externally using universal serial bus (USB), Ethernet, serial connections, and so forth. The user interface may provide functionality to allow the user to interact with one or more applications of the computing system 150 by providing inputs (e.g., sample identities, desired dilution factors, standard identities, chemical agent identities, eluent identities/locations, fluid addition flow rates, chemical reaction kinetics, chemical agent interaction duration, etc.) via the touch screen and/or the I/O devices. For example, the user interface may cause an application programming interface (API) to be generated to expose functionality to an inline chemical addition control module to configure the application for display by the display or in combination with another display. In embodiments, the API may further expose functionality to configure the inline chemical addition control module to allow the user to interact with an application by providing inputs via the touch screen and/or the I/O devices to provide desired inputs for analysis.

The inline chemical addition control module may comprise software, which is storable in memory (e.g., the carrier medium 156) and executable by the processor 152, to perform a specific operation or group of operations to furnish functionality to the computing system 150. The inline chemical addition control module provides functionality to control the introduction of one or more chemical agents or other fluids to the samples from the sampling device 102. For example, the inline chemical addition control module may control amounts of the carrier and/or the diluent that are supplied by pumps of the pump system 118 (e.g., to the first valve 110 for mixing with the sample 103 carried from the holding loop 116).

Referring again to FIG. 1, the second valve 112 is shown coupled between the first valve 110 and the third valve 114 and is configured to receive fluids from the first valve 110 and the third valve 114. For example, in an implementation the second valve 112 is switchable between at least two configurations, wherein in a first valve configuration, the second valve 112 provides a flow path to receive the diluted sample from the first valve 110 and direct the diluted sample to a sample holding loop 120. The second valve 112 is also coupled to the separation column 106, such as to introduce fluids received from the first valve 110 and the third valve 114 to the separation column 106. For example, the second valve 112 can switch to a second valve configuration to provide a flow path that can introduce one or more of the sample, diluted sample solution, standard solution, diluted standard solution, or the like from the holding loop 120 (or directly from the first valve 110) to the separation column 106 to separate the various species of the chemical of interest. In an implementation, once the sample or diluted sample has been introduced to the separation column 106, the second valve 112 can introduce one or more eluents received from the third valve 114 for transferring the species of interest from the separation column 106 to the ICP torch assembly 108 for ICP-MS analysis. Alternatively or additionally, the species of interest can be directed to another analytic instrument (e.g., electrospray ionization mass spectrometer (ESI-MS), a different ICP instrument, etc.). In implementations, the fluid held in the holding loop 120 bypasses the speciation column 106 and is directed to an analytic instrument without speciation or separation of one species from another species within the sample.

Figure 3:
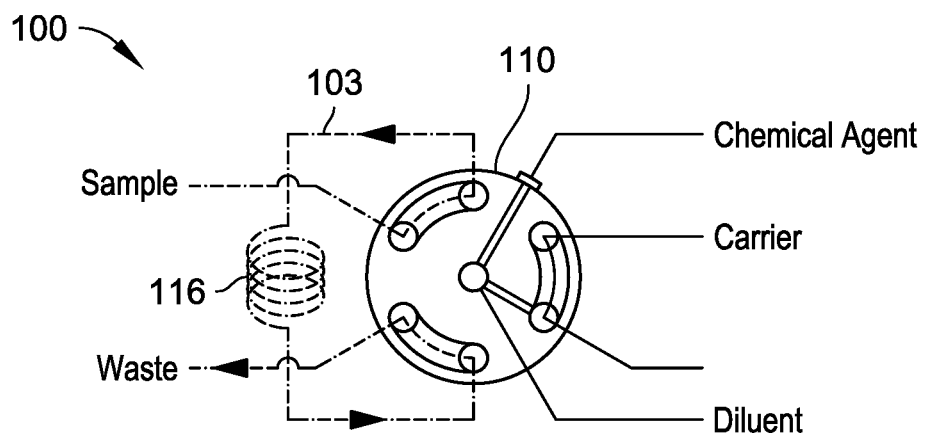
FIG. 3 is a schematic illustration of a valve system for a system for inline addition of chemical agents to samples for analytic determinations, with a valve in a sample loading configuration.

In implementations, the system 100 can facilitate introduction of one or more of a diluent, a standard, a chemical agent to interact with the sample (e.g., via one or more reactions), one or more eluents, a derivatization fluid, or combinations thereof, prior to introduction to the separation column 106, following introduction to the separation column 106, or combinations thereof. For example, referring to FIGS. 3 through 7, the valve system 104 of the system 100 includes the first valve 110, the second valve 112, and a separation column bypass valve 300 configured to control fluid flow through the system 100 in concert with the pump system 118. Referring to FIG. 3, the first valve 110 is shown in a first configuration to receive a sample 103 from sampling device 102 and to hold the received sample 103 in the holding loop 116. While the holding loop 116 is shown as a coiled section of tubing, the holding loop 116 is not limited to coiled configurations and can include other configurations including, but not limited to, serpentine configurations, linear configurations, combinations thereof, or the like, having a precise total volume. During loading of the sample 103 into the holding loop 116, the second valve 112 and the separation column bypass valve 300 can be in configurations to rinse the respective valves and fluid lines, direct conditioning fluids into the separation column 106, or facilitate other fluid handling.

Figure 4:
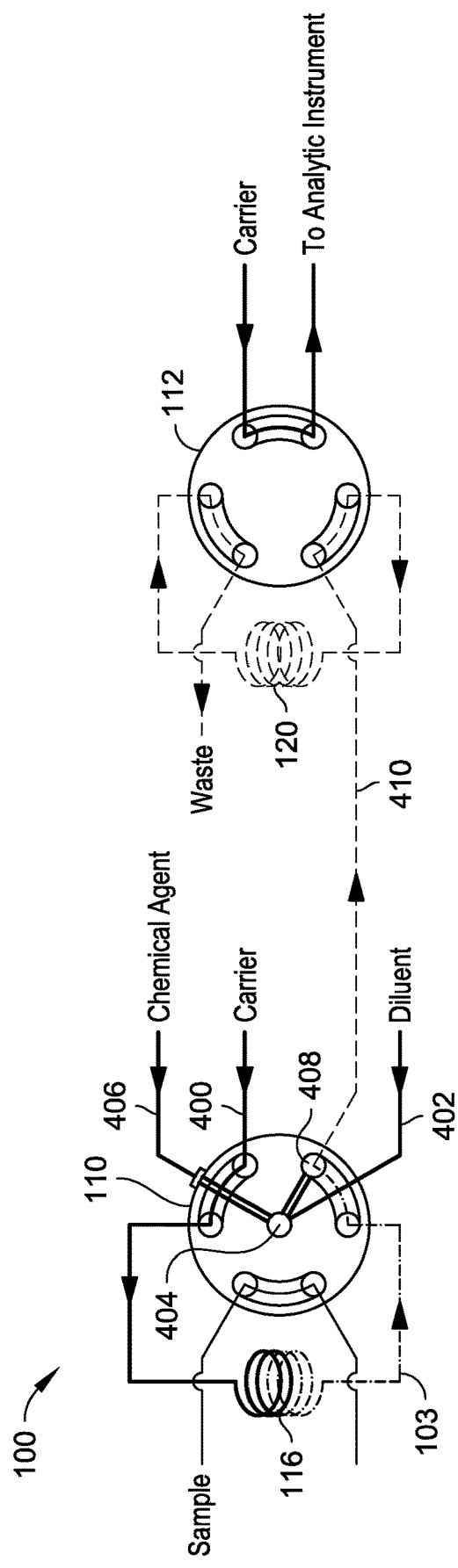
FIG. 4 is a schematic illustration of a valve system for a system for inline addition of chemical agents to samples for analytic determinations, with the valve system in a chemical addition configuration.
Figure 5:
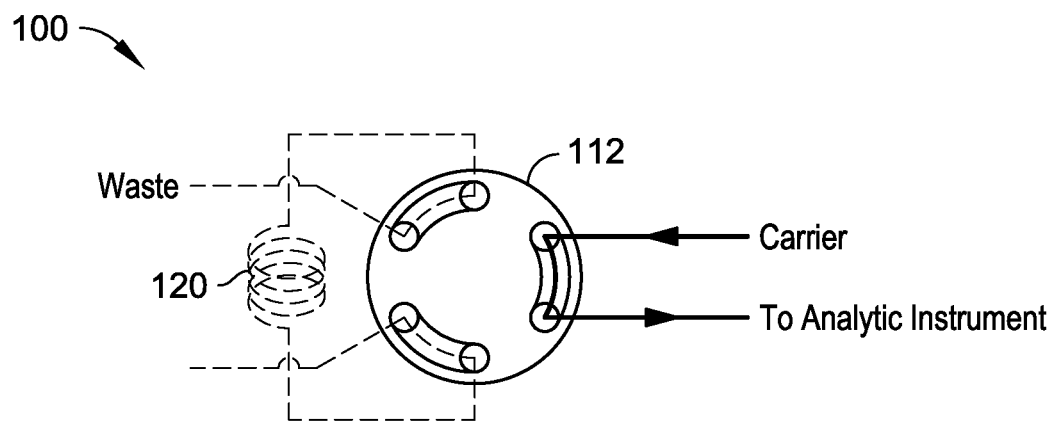
FIG. 5 is a schematic illustration of a valve of the valve system of FIG. 4 in a holding state configuration in accordance with example implementations of the present disclosure.

Referring to FIG. 4, the first valve 110 is switched to a second configuration to introduce a carrier fluid (e.g., through a carrier fluid line 400) to push the sample from the holding loop 116, whereby one or more of a diluent (e.g., supplied to the first valve 110 via a diluent line 402 to a mixing port 404) or a chemical agent (e.g., supplied to the first valve 110 via a chemical line 406 to the mixing port 404) is introduced to the sample at a mixing port 408. The chemical agent can include a tag configured for specific association with a species of interest in the sample, such as through a binding mechanism, a chemical reaction to produce a more detectable species or other reaction product(s) of interest, a polyatomic combination, or the like. For example, the chemical agent can include, but is not limited to, a derivatization agent (e.g., a chiral derivatization agent), a chelation agent, a bio-tag, a metal-tag, a chemical agent configured to induce a reaction, a chemical agent configured to produce a polyatomic combination with the sample or portion thereof, or combinations thereof, that produces a molecular species that can be more easily detected or have better detection resolution than analysis of the sample alone. Introduction of a chemical agent to the sample can facilitate kinetics analyses by providing one or more predetermined interaction times to occur between a sample and the chemical agents with subsequent analysis of the sample solution following any reactions as a result of the chemical agent interactions, as described further herein.

The sample (e.g., diluted with diluent, spiked with chemical agent, or both) is introduced to the second valve 112 (e.g., via transfer line 410) in a first configuration (e.g., a load configuration) and into the sample holding loop 120. While the sample holding loop 120 is shown as a coiled section of tubing, the sample holding loop 120 is not limited to coiled configurations and can include other configurations including, but not limited to, serpentine configurations, linear configurations, combinations thereof, or the like, having a precise total volume. For instance, the volume of the sample holding loop 120 can be used as a basis for concentration calculations for analytes measured by the analytic instrumentation. When the chemical agent and the sample fluid are introduced to each other (e.g., at the mixing port 408), the two streams begin to interact. The time of interaction between the two streams prior to introduction to the sample holding loop 120 can depend on the flow rate of the mixed sample stream flowing through the transfer line 410 and on the length of the transfer line 410. Accordingly, the time of interaction can be set by controlling the flow rate of the mixed sample stream (e.g., through operation of the pump system 118) and by utilizing a known length of transfer line 410. Alternatively or additionally, the second valve 112 can include one or more sensors to detect the presence of the mixed sample stream received from the transfer line 410, where the time between switching the first valve to the second configuration and detection of the mixed sample stream at the second valve 112 can be used to determine the time of interaction between the sample and the chemical agent prior to introduction to the sample holding loop 120.

The system 100 can provide a holding state for the sample held in the sample holding loop 120 to provide interaction between the sample and any chemical agent added during transfer from the first valve 110 to result in chemical reactions, physical reactions, and combinations thereof. For example, referring to FIG. 5, when the sample holding loop 120 is filled, the system 100 can regulate the pump system 118 to maintain the sample within the sample holding loop 120 for a predetermined period of time (e.g., no fluid entering or leaving the sample holding loop 120 during the holding period of time). The period of time can depend on the kinetics of the reaction taking place between the sample and the chemical agent. For instance, for a reaction expected to take within about 10 seconds, the predetermined period of time can be about 10 seconds, or about 10 seconds less the transit time taken between initial introduction of the sample and the chemical agent (e.g., at mixing port 408) and filling the sample holding loop 120. In implementations, the predetermined period of time is based on a schedule of sample analyses according to a kinetics study of a sample or series of samples. For instance, a first sample is permitted to rest within the sample holding loop 120 for a first period of time (e.g., 8 seconds), a second sample is permitted to rest within the sample holding loop 120 for a second period of time (e.g., 9 seconds), a third sample is permitted to rest within the sample holding loop 120 for a third period of time (e.g., 10 seconds) to track extents of reactions occurring between the chemical agent and portions of the same sample or different samples. For instance, the system 100 can provide the holding time operating the second valve 112 according to a rest state, where pumps of the pump system 118 do not cause movement of fluid out from the sample holding loop 120. The second valve 112 can be in the first configuration during the holding state (e.g., shown in FIG. 5) or transitioned to a second configuration (e.g., shown in FIG. 6) during the holding state with the pump system 118 maintaining the sample within the sample holding loop 120 during the pendency of the holding state.

Figure 6:
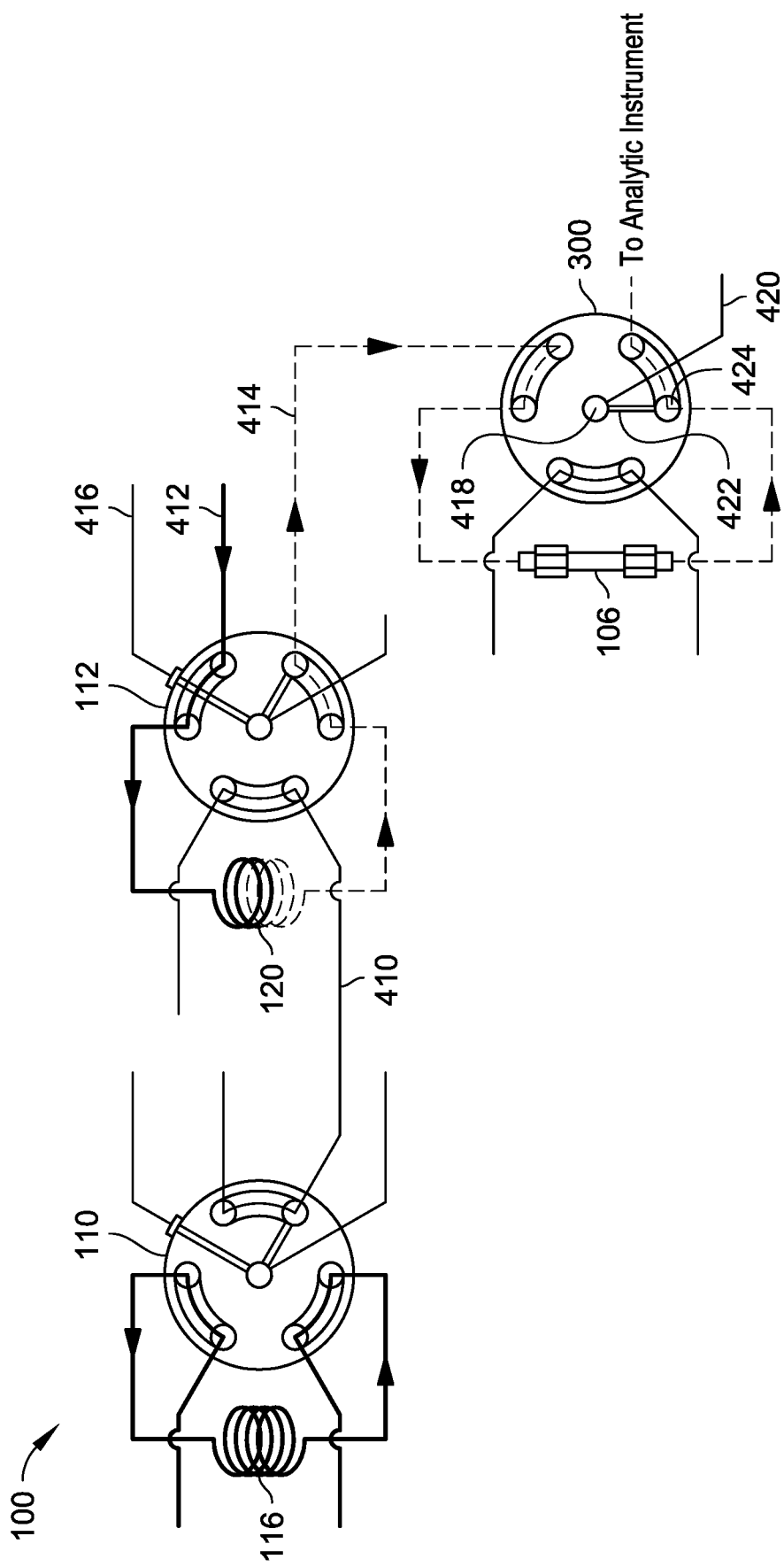
FIG. 6 is a schematic illustration of the valve system of FIG. 4 with a separation column bypass valve in a column flow configuration.
Figure 7:
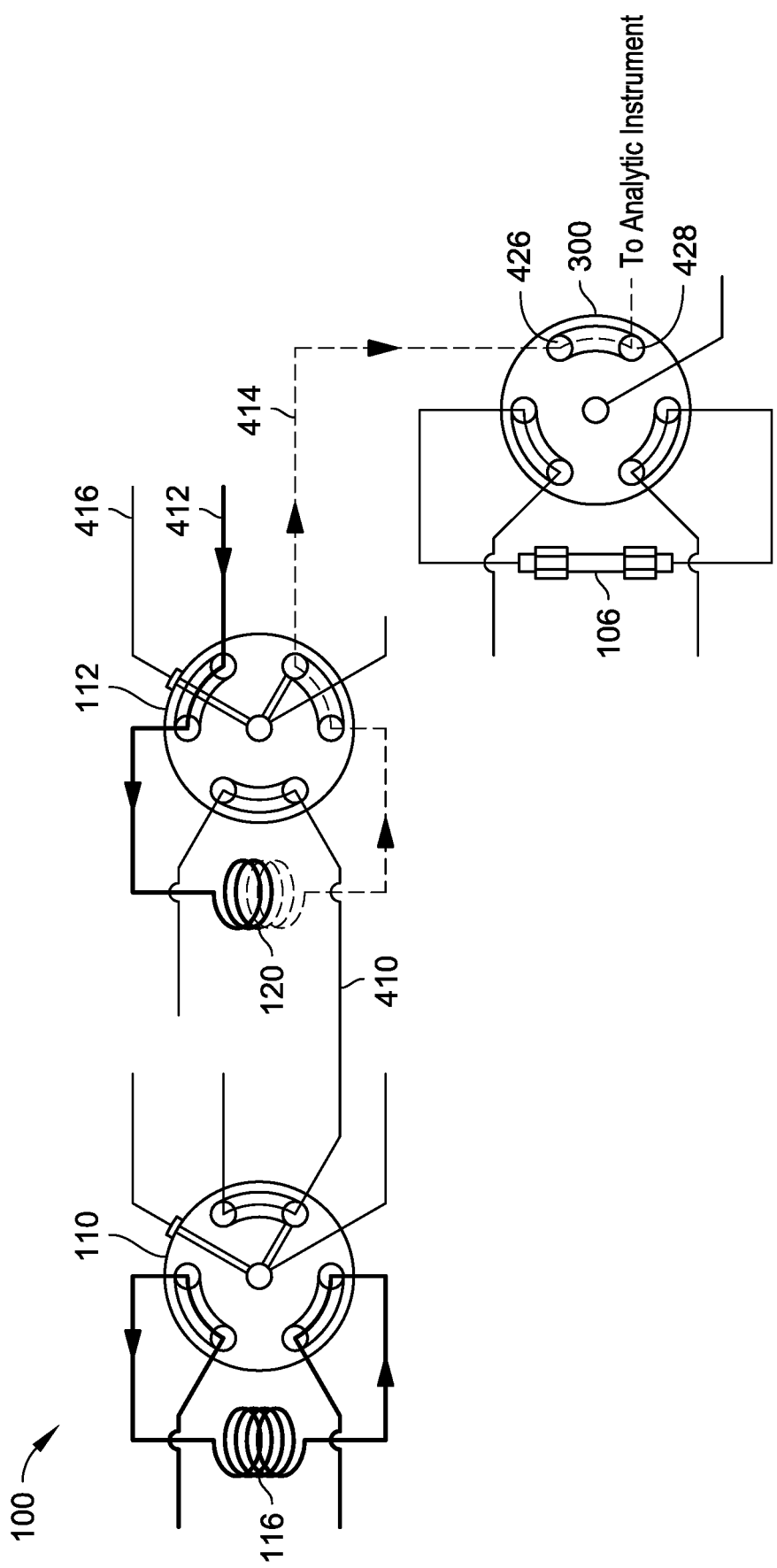
FIG. 7 is a schematic illustration of the valve system of FIG. 6 with the separation column bypass valve in a bypass configuration.

The system 100 can then introduce the sample to an analytic instrument once the sample and chemical agent have interacted for the predetermined time period(s). For instance, referring to FIG. 6, the first valve 110 is switched to the first configuration to rinse the holding loop 116 and the second valve 112 is switched to a second configuration to introduce a carrier fluid, eluent, working fluid, or other fluid (e.g., through a fluid line 412) to carry the sample from the sample holding loop 120 to the separation column bypass valve 300 (e.g., via transfer line 414). The separation column bypass valve 300 can operate according to various configurations to direct the sample through the separation column 106 (e.g., a column separation configuration) and subsequently to the analytic instrument, to direct the sample to the analytic instrument without passing through the separation column 106 (e.g., a column bypass configuration), or to provide other operations. The separation column bypass valve 300 is shown in FIG. 6 in the column separation configuration to direct the sample through the column 106 for speciation or other separation, and out to the analytic instrument or a sample preparation portion thereof (e.g., torch assembly 108, a nebulizer, etc.). The chemical agent introduced to the sample (e.g., via the mixing port 404) can bind to portions of the sample as a tag, where the presence or absence of the tag can influence the relative rate with which the sample is permitted to pass through the separation column 106, causing tagged portions to move more quickly or less quickly (e.g., bound within, moved more slowly through, etc.) through the separation column 106. For example, a chelation agent, bio-tag, or metal-tag can react with a protein or cell component within a sample or a sample reaction product, causing sample components or sample reaction components that do not include a tagged protein or cell component to pass through the separation column, whereas tagged protein or cell components are passed at a later time (e.g., via a slower rate or through subsequent elution). As another example, barium or calcium can react with fluorine present in samples or sample reaction products to form a complex (Ba—F, Ca—F) detectable by ICP analytic instruments. Alternatively or additionally, the chemical agent can cause a conformational change in one or more analytes of the sample, such as via chiral derivatization. For example, a sample containing amino acid enantiomers can be mixed with a buffer solution and a chiral derivatization agent to react within the sample holding loop 120 to form amino acid diastereomers having mobility characteristics through the separation column 106 that differ from the amino acid enantiomers to provide detectable separation via the analytic instrument (e.g., an electrospray ionization mass spectrometer).

In implementations, the fluid line 412 is coupled to a first fluid syringe pump to receive a first fluid to facilitate separation of the species of interest of the sample, or a portion thereof. Introduction of a single fluid (e.g., eluent) to the column 106 permits isocratic elution methods. The second valve 112 can also receive a second fluid (e.g., via a second fluid syringe pump) introducing the second fluid via fluid line 416 to introduce a second fluid to the separation column bypass valve 300 (e.g., via transfer line 414) to introduce a standard fluid, to facilitate elution of the remainder of species retained by the column 106 (e.g., after the first fluid passes through column 106 for a first period of time), or to provide other fluid handling. Multiple eluents with separate syringe pump control can facilitate gradient elutions through the column 106, where the first eluent can be introduced to the second valve 112 for a first period of time followed by introduction of the second eluent to the second valve 112 for a second period of time.

The system 100 can also facilitate introduction of additional fluids to a sample after the sample exits the column 106 and before the sample is introduced to the torch assembly 108 or other component of the ICP instrument. For example, in an implementation, the separation column bypass valve 300 includes a fluid addition port 418 coupled to a fluid addition line 420 to receive a fluid into the separation column bypass valve 300 for mixing with the sample after the sample exits the column 106. For example, the fluid addition line 420 can receive the additional fluid through pumping action of a third syringe pump that is operably coupled to a fluid source (e.g., a reagent bottle). The additional fluid can include, but is not limited to, a diluent, a standard, or a derivatization fluid. Introduction of a diluent following separation of the chemical species in the column 106 allows for post-column dilution, which can facilitate favorable column separation conditions, such as by utilizing certain concentrations of acids or salts, while avoiding saturation of ICP-MS cones if the separation conditions are inefficient or detrimental for analysis by the ICP instrument. For example, for a sample flow rate of 250 µL/min, a diluent can be added at a flow rate of 250 µL/min to reduce the concentration of the sample by half just before the sample is introduced to the ICP instrument. Introduction of a standard following separation of the chemical species in the column 106 allows for post-column standard checks, such as by providing a standard for a fixed time period to provide an intermittent internal check, or by providing a standard on a continuous basis to provide continuous operation stability checks (e.g., to verify normal operating functions of the system 100), or the like. Introduction of chemicals for derivatization following separation of the chemical species in the column 106 allows formation of detectable complexes with otherwise difficult-to-detect species to facilitate analysis of the species in the analytic instrument. For example, barium or calcium can be introduced to the separation column bypass valve 300 to form a complex with fluorine (Ba—F, Ca—F) detectable by the analytic instrument. In implementations, the fluid introduced to the separation column bypass valve 300 via the fluid addition line 420 flows through the fluid addition port 418 and through a fluid addition channel 422 to mix with the sample leaving the column 106 at a mixing port 424 of the separation column bypass valve 300 before leaving the separation column bypass valve 300 for analysis by the analytic instrument.

In implementations, the system 100 can bypass the column 106 (e.g., to provide a total metals analysis for the sample, to provide a total reaction product analysis for the sample, etc.). For example, referring to FIG. 7, the separation column bypass valve 300 is shown in a second configuration (e.g., the column separation configuration) to receive a fluid from the second valve 112 into a receiving port 426 of the separation column bypass valve 300 and to direct the fluid to an exit port 428, where the fluid leaves the separation column bypass valve 300 without passing through the column 106 and is directed to the analytic instrument.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a fluid sample from an autosampler with a valve system;
   receiving a chemical agent with the valve system;
   introducing, via a pump system, the fluid sample and the chemical agent inline via a mixing port of the valve system to produce a mixed sample;
   transferring, via the pump system, the mixed sample to a sample holding loop fluidically coupled with the valve system;
   holding the mixed sample within the sample holding loop for a holding period of time to permit a reaction between the fluid sample and the chemical agent;
   directing, via the pump system, the mixed sample from the sample holding loop to an analytic instrument following expiration of the holding period of time;
   subsequent to directing the mixed sample from the sample holding loop to the analytic instrument following expiration of the holding period of time, receiving a second fluid sample from the autosampler with the valve system;
   introducing the second fluid sample and the chemical agent inline via the mixing port of the valve system to produce a second mixed sample; and
   holding the second mixed sample within the sample holding loop for a second holding period of time to permit a reaction between the second fluid sample and the chemical agent, wherein the second holding period of time differs from the first holding period of time.

2. The method of claim 1, wherein directing, via the pump system, the mixed sample from the sample holding loop to the analytic instrument following expiration of the holding period of time includes:
   directing, via the pump system, the mixed sample from the sample holding loop through a separation column to separate one or more chemical species from respective other chemical species in the mixed sample and subsequently to the analytic instrument following expiration of the holding period of time.

3. The method of claim 1, wherein the chemical agent is introduced to the valve system through action of at least one pump.

4. The method of claim 1, wherein the chemical agent includes a chiral derivatization agent.

5. The method of claim 1, further comprising:
   directing the second mixed sample from the sample holding loop to the analytic instrument following expiration of the second holding period of time.

6. The method of claim 5, further comprising:
   subsequent to directing the second mixed sample from the sample holding loop to the analytic instrument following expiration of the second holding period of time, receiving a third fluid sample from the autosampler with the valve system;
   introducing the third fluid sample and the chemical agent inline via the mixing port of the valve system to produce a third mixed sample; and
   holding the third mixed sample within the sample holding loop for a third holding period of time to permit a reaction between the third fluid sample and the chemical agent, wherein the third holding period of time differs from each of the first holding period of time and the second holding period of time.

7. The method of claim 6, further comprising:
   directing the third mixed sample from the sample holding loop to the analytic instrument following expiration of the third holding period of time.

8. The method of claim 1, wherein the analytic instrument includes a mass spectrometer.

9. The method of claim 8, wherein the mass spectrometer includes an electrospray ionization mass spectrometer.

10. A method comprising:
    receiving a fluid sample with a first valve;
    receiving a chemical agent with the first valve;
    introducing, via a pump system, the fluid sample and the chemical agent inline via a mixing port of the first valve to produce a mixed sample;
    transferring, via the pump system, the mixed sample to a second valve;
    directing the mixed sample to a sample holding loop fluidically coupled with the second valve;
    holding the mixed sample within the sample holding loop for a holding period of time to permit a reaction between the fluid sample and the chemical agent;
    directing, via the pump system, the mixed sample from the sample holding loop to an analytic instrument following expiration of the holding period of time;
    subsequent to directing the mixed sample from the sample holding loop to the analytic instrument following expiration of the holding period of time, receiving a second fluid sample with the first valve;
    introducing the second fluid sample and the chemical agent inline via the mixing port of the first valve to produce a second mixed sample;
    transferring the second mixed sample to the second valve;
    directing the second mixed sample to the sample holding loop; and
    holding the second mixed sample within the sample holding loop for a second holding period of time to permit a reaction between the second fluid sample and the chemical agent, wherein the second holding period of time differs from the first holding period of time.

11. The method of claim 10, wherein directing, via the pump system, the mixed sample from the sample holding loop to the analytic instrument following expiration of the holding period of time includes:

directing, via the pump system, the mixed sample from the sample holding loop through a separation column to separate one or more chemical species from respective other chemical species in the mixed sample and subsequently to the analytic instrument following expiration of the holding period of time.

12. The method of claim 10, wherein the chemical agent is introduced to the valve system through action of at least one pump.

13. The method of claim 10, wherein the chemical agent includes a chiral derivatization agent.

14. The method of claim 10, further comprising:

directing the second mixed sample from the sample holding loop to the analytic instrument following expiration of the second holding period of time.

15. The method of claim 14, further comprising:

subsequent to directing the second mixed sample from the sample holding loop to the analytic instrument following expiration of the second holding period of time, receiving a third fluid sample with the first valve;

introducing the third fluid sample and the chemical agent inline via the mixing port of the first valve to produce a third mixed sample;

transferring the third mixed sample to the second valve;

directing the third mixed sample to the sample holding loop; and holding the third mixed sample within the sample holding loop for a third holding period of time to permit a reaction between the third fluid sample and the chemical agent, wherein the third holding period of time differs from each of the first holding period of time and the third holding period of time.

16. The method of claim 15, further comprising:

directing the third mixed sample from the sample holding loop to the analytic instrument following expiration of the third holding period of time.

17. The method of claim 10, wherein the analytic instrument includes a mass spectrometer.

18. The method of claim 17, wherein the mass spectrometer includes an electrospray ionization mass spectrometer.

\* \* \* \* \*